(12) United States Patent
Yamakawa

(10) Patent No.: US 6,295,169 B1
(45) Date of Patent: Sep. 25, 2001

(54) IMAGE READOUT LENS AND IMAGE READOUT APPARATUS USING THE SAME

(75) Inventor: Hiromitsu Yamakawa, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/260,499

(22) Filed: Mar. 2, 1999

(30) Foreign Application Priority Data

Mar. 9, 1998 (JP) .................................................. 10-074990

(51) Int. Cl.$^7$ ................................. G02B 9/36; G02B 9/14
(52) U.S. Cl. ............................................. 359/775; 359/788
(58) Field of Search ........................... 359/775, 776–778, 359/771–772, 768, 765, 763, 755–756, 784–785, 788, 790

(56) References Cited

U.S. PATENT DOCUMENTS

| | | | |
|---|---|---|---|
| 5,216,548 | * | 6/1993 | Kung ..................... 359/775 |
| 5,311,364 | * | 5/1994 | Kanoshima et al. .................. 359/708 |
| 5,493,449 | * | 2/1996 | Yamakawa ............................ 359/775 |
| 5,768,021 | * | 6/1998 | Ori ........................ 359/618 |

FOREIGN PATENT DOCUMENTS 07104185   4/1995 (JP) ................................ G02B/13/24

* cited by examiner

Primary Examiner—Jordan M. Schwartz
(74) Attorney, Agent, or Firm—Snider & Associates; Ronald R. Snider

(57) ABSTRACT

In an image readout lens comprising four lens elements having positive, negative, negative, and positive refracting powers, respectively, the glass material for at least one of the second and third lenses is defined in terms of relative partial dispersion and Abbe number, so as to yield an image readout lens which favorably corrects chromatic aberration and is suitable as a color-image readout lens. Disposed successively from the object side are a first lens $L_1$ made of a positive meniscus lens which is convex toward the object, a second lens $L_2$ and a third lens $L_3$ each having a surface on an image side concave toward the image and a negative refracting power, and a fourth lens $L_4$ made of a biconvex lens, wherein a lens glass material of at least one of the second lens $L_2$ and third lens $L_3$ satisfies the following conditional expression (1):

$$\theta_{g,F} + 0.0019 \upsilon_d < 0.650 \quad (1)$$

where $\theta_{g,F}$ is the relative partial dispersion of the lens glass material, and $\upsilon_d$ is the Abbe number of the lens glass material.

6 Claims, 14 Drawing Sheets

EXAMPLE 1,2

EXAMPLE 3

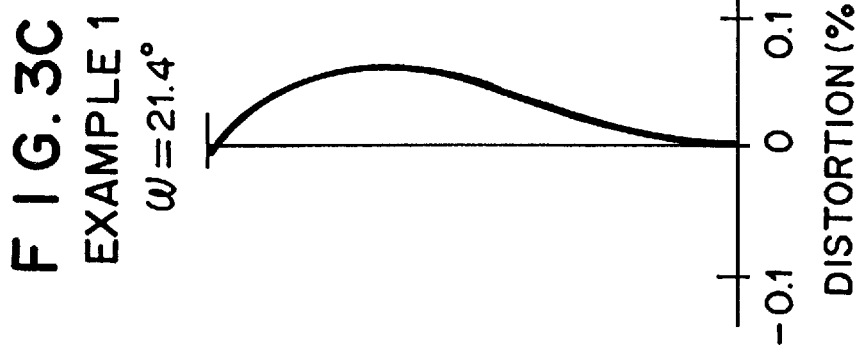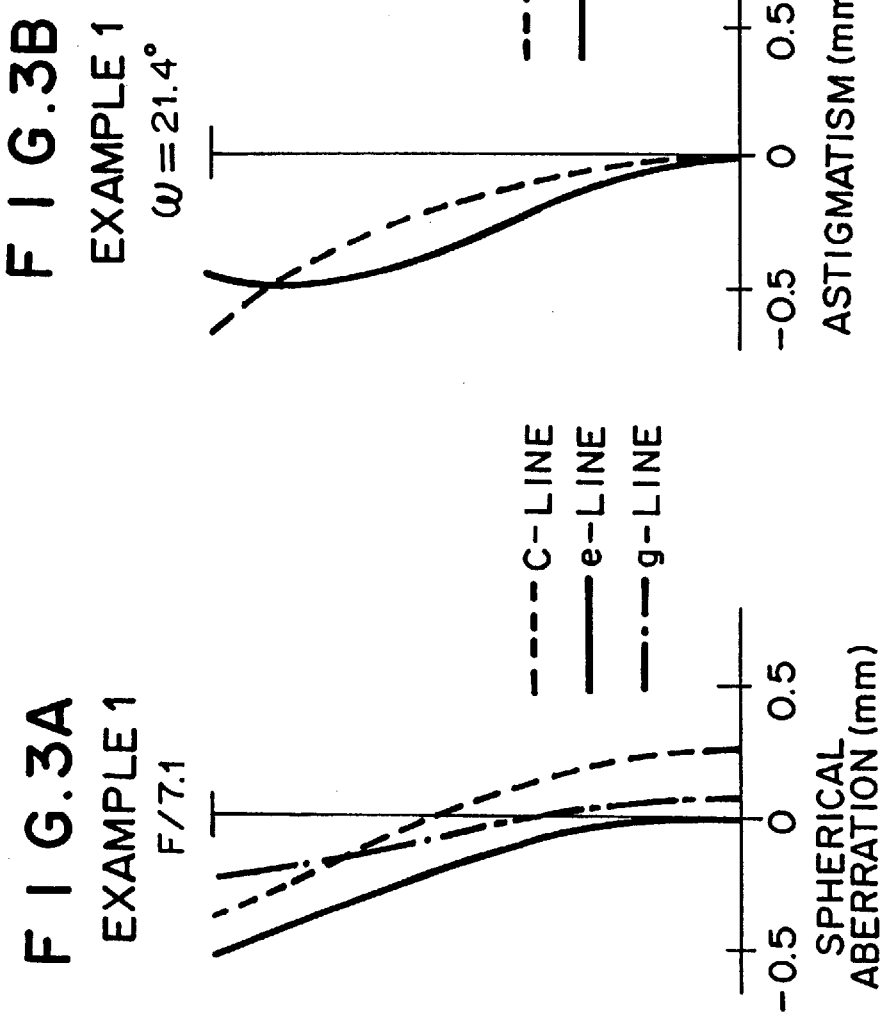

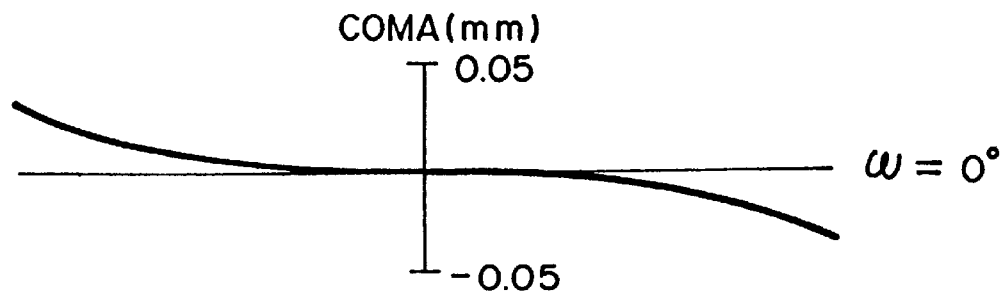
FIG. 4A EXAMPLE 1
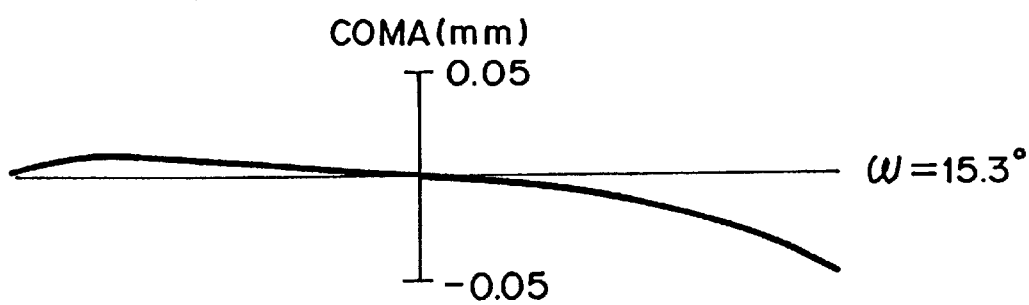
FIG. 4B EXAMPLE 1
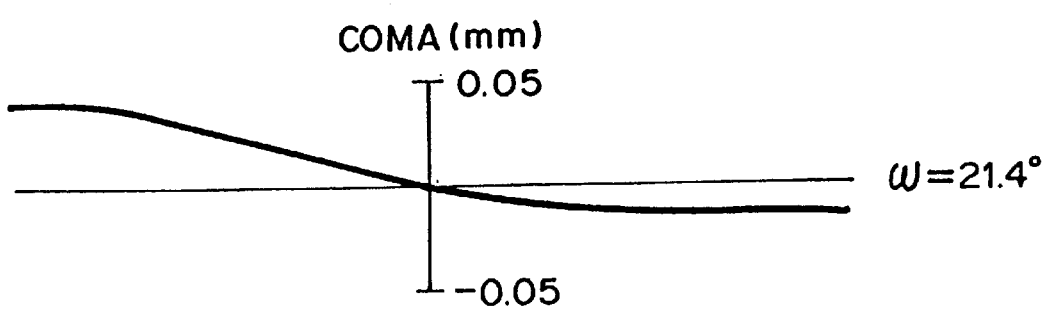
FIG. 4C EXAMPLE 1

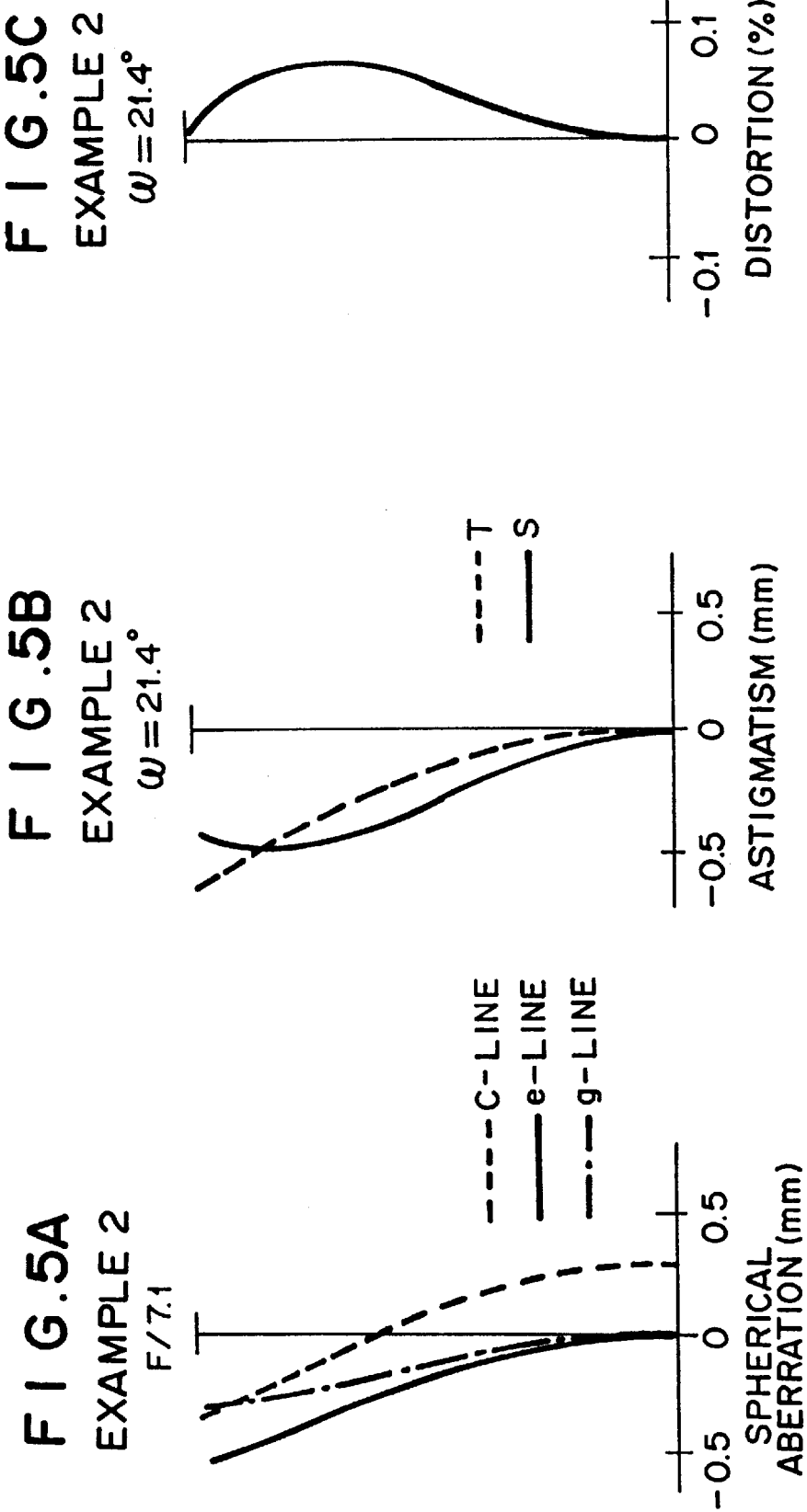

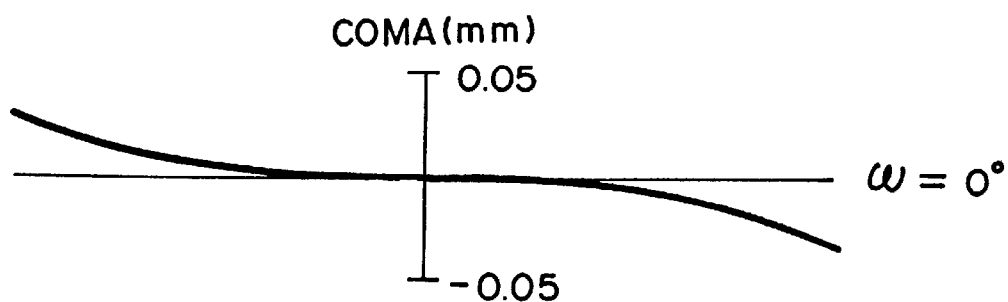
FIG. 6A EXAMPLE 2
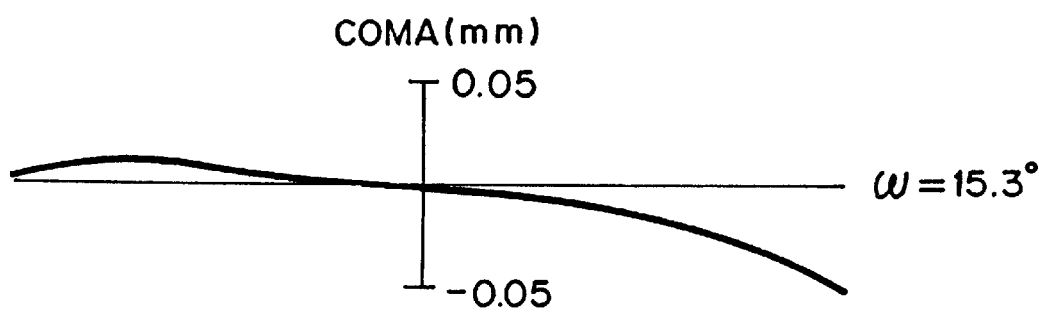
FIG. 6B EXAMPLE 2
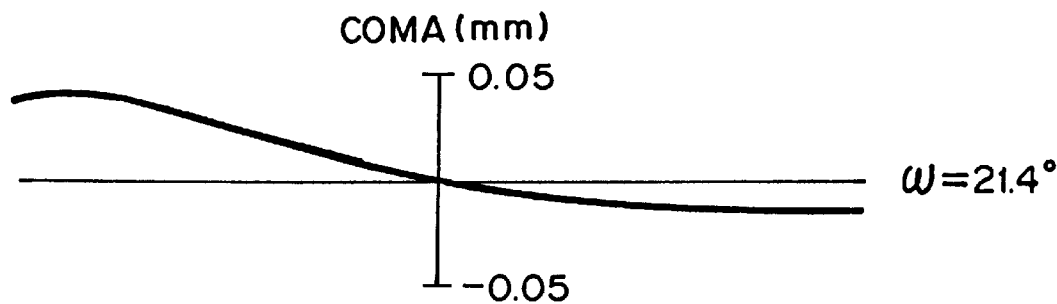
FIG. 6C EXAMPLE 2

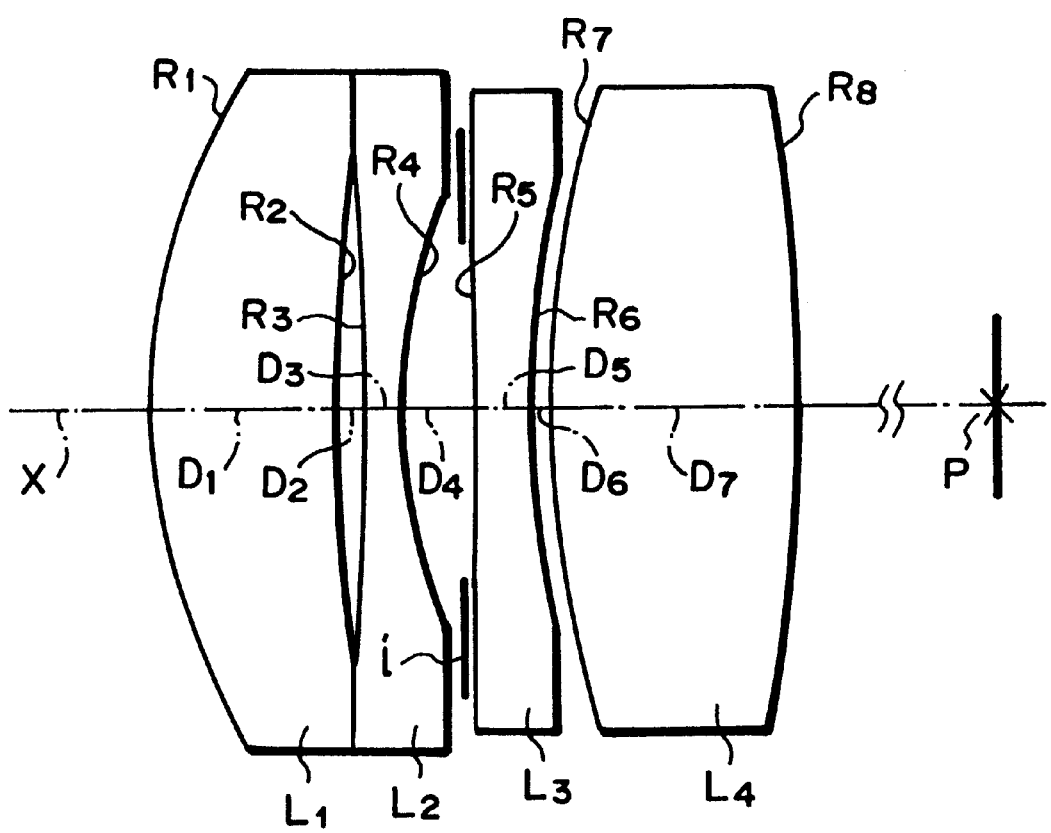

EXAMPLE 3
ω=21.4°
DISTORTION (%)

EXAMPLE 3
ω=21.4°
---- T
—— S
ASTIGMATISM (mm)

EXAMPLE 3
F/7.1
---- C-LINE
—— e-LINE
—·— g-LINE
SPHERICAL ABERRATION (mm)

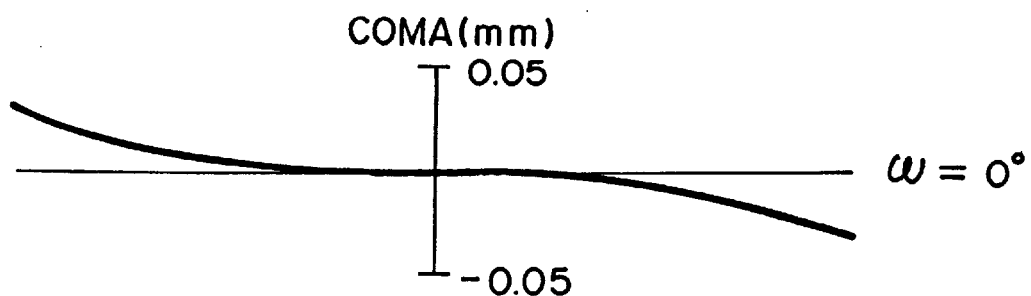
FIG. 9A EXAMPLE 3
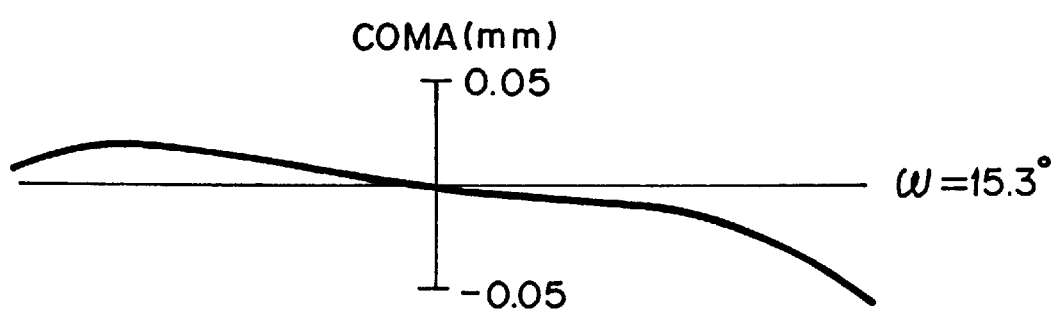
FIG. 9B EXAMPLE 3
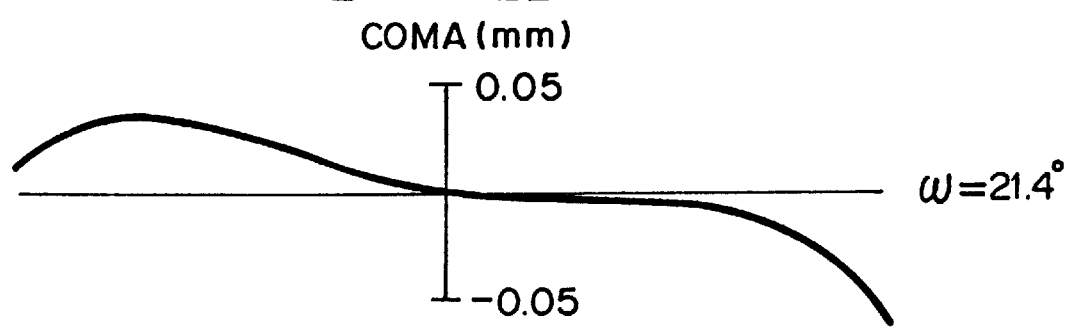
FIG. 9C EXAMPLE 3

EXAMPLE 4,5

EXAMPLE 4
ω = 21.4°

EXAMPLE 4
ω = 21.4°

EXAMPLE 4
F/7.1

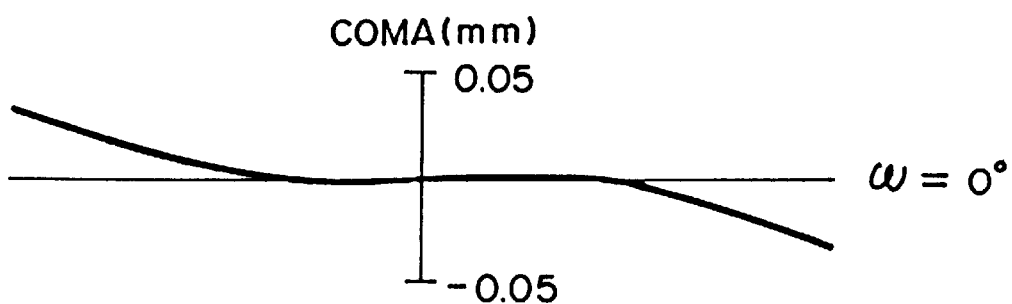
FIG. 12A EXAMPLE 4
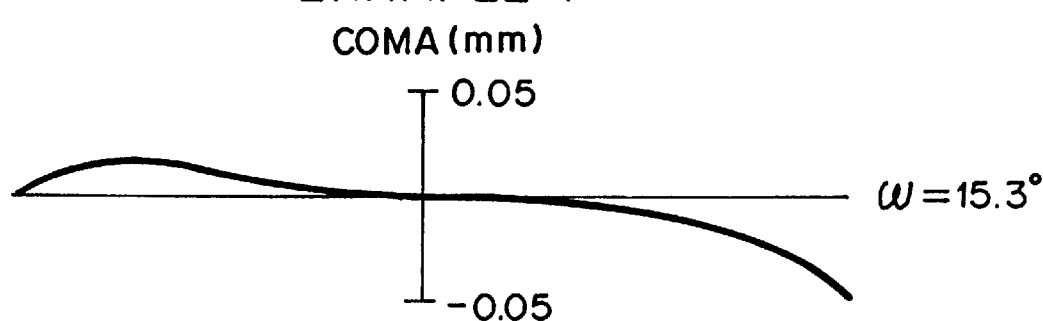
FIG. 12B EXAMPLE 4
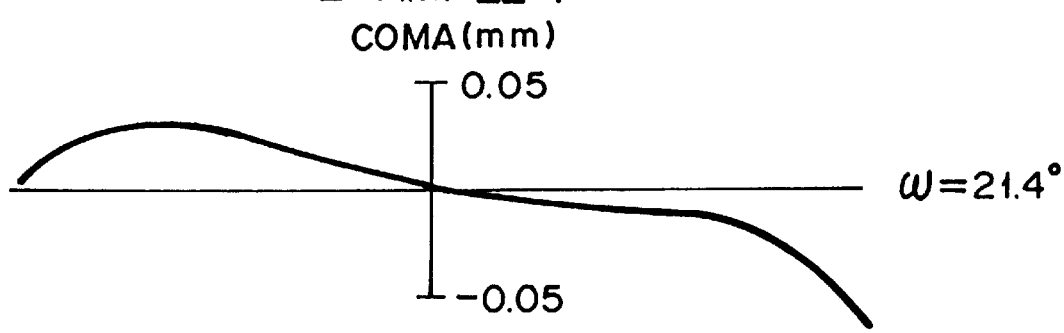
FIG. 12C EXAMPLE 4

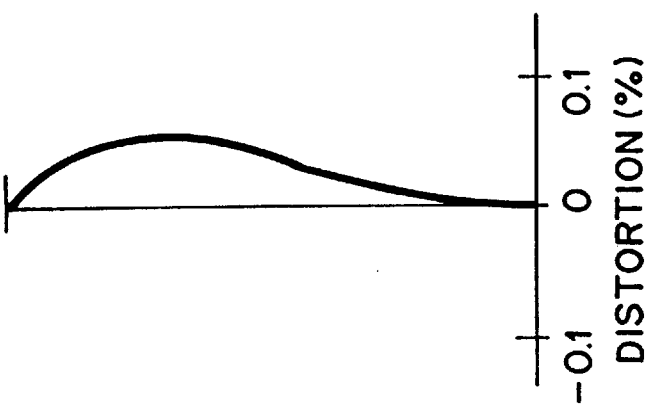
FIG.13C EXAMPLE 5 ω=21.4°
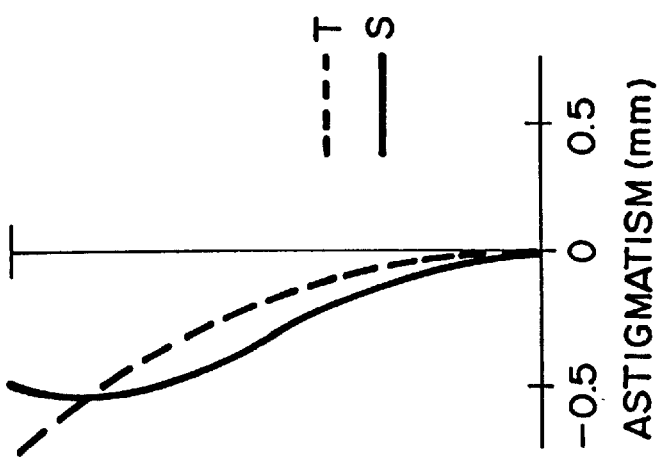
FIG.13B EXAMPLE 5 ω=21.4°
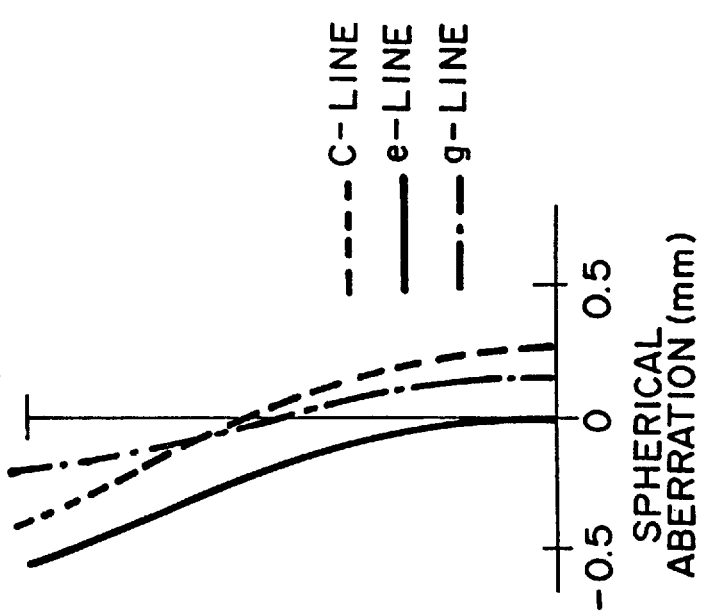
FIG.13A EXAMPLE 5 F/7.1

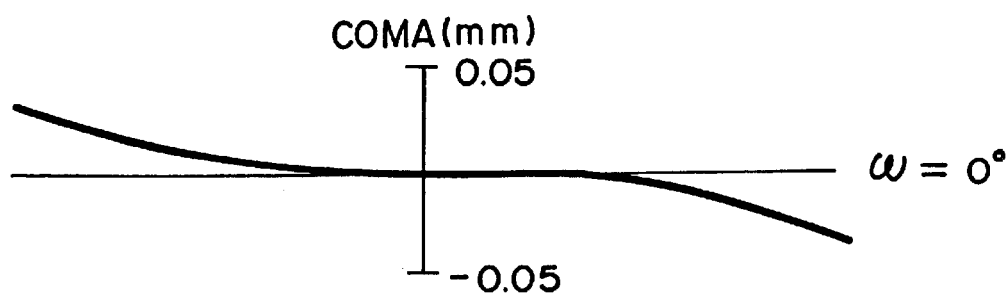
FIG. 14A EXAMPLE 5
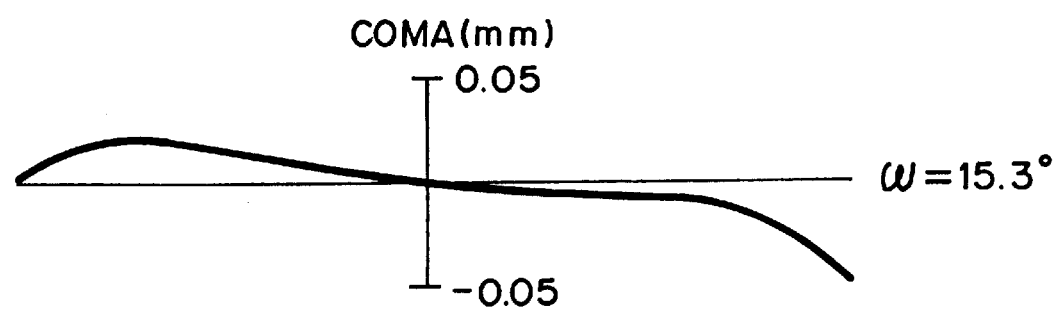
FIG. 14B EXAMPLE 5
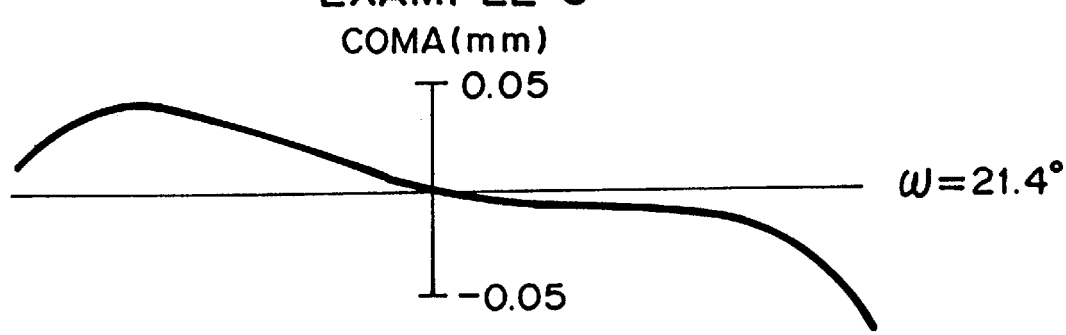
FIG. 14C EXAMPLE 5

IMAGE READOUT LENS AND IMAGE READOUT APPARATUS USING THE SAME

RELATED APPLICATIONS

This application claims the priority of Japanese Patent Application No. 10-74990 filed on Mar. 9, 1998, which is incorporated herein by reference.

BACKGROUND OF THE INVENTION

1. Field of the Invention

The present invention relates to an image readout lens used in an optical system of an image readout apparatus such as facsimile machine or image scanner, for example; and an image readout apparatus using the same. In particular, the present invention relates to a color-image readout lens used for reducing or enlarging an image and an image readout apparatus using the same.

2. Description of the Prior Art

Image readout lenses used in facsimile machines, image scanners, and the like of a type forming a reduced or enlarged image of an original are basically required to have a high resolution, large marginal light quantity, and minimized distortion at the imaging magnification used.

Known as an imaging lens which satisfies these requirements and reduces the weight and cost of the lens system and accordingly the weight and cost of the optical apparatus as a whole is, for example, that disclosed in commonly assigned Japanese Unexamined Patent Publication No. 7-104185, in which the number of lens elements is reduced to 4.

Though the above-mentioned four-element imaging lens disclosed in Japanese Unexamined Patent Publication No. 7-104185 favorably corrects both image surface curvature and distortion, its correction of chromatic aberration may be insufficient as a color-image readout lens.

SUMMARY OF THE INVENTION

In view of such circumstances, it is an object of the present invention to provide an image readout lens which can favorably correct chromatic aberration in particular, form high-quality images, and favorably be used for reading out color images, by defining the lens glass material together with the lens form and configuration.

It is another object of the present invention to provide an image readout apparatus using this image readout lens.

The image readout lens in accordance with the present invention comprises, successively from an object side, a first lens made of a positive meniscus lens which is convex toward the object, second and third lenses each having a surface on an image side concave toward the image and a negative refracting power, and a fourth lens made of a biconvex lens, wherein a lens glass material of at least one of the second and third lenses satisfies the following conditional expression (1):

$$\theta_{g,F} + 0.0019\upsilon_d < 0.650 \tag{1}$$

where $\theta_{g,F}$ is the relative partial dispersion of the lens glass material defined by $\theta_{g,F} = (N_g - N_F)/(N_F - N_C)$; and $\upsilon_d$ is the Abbe number of the lens glass material defined by $\upsilon_d = (N_d - 1)/(N_F - N_C)$ where $N_g$ is the refractive index of the glass material at a wavelength of 435.8 nm;

$N_F$ is the refractive index of the glass material at a wavelength of 486.1 nm;

$N_C$ is the refractive index of the glass material at a wavelength of 656.3 nm; and $N_d$ is the refractive index of the glass material at a wavelength of 587.6 nm.

Preferably, the image readout lens in accordance with the present invention further satisfies the following conditional expression (2):

$$0.35 < f_1/f < 0.58 \tag{2}$$

where f is the composite focal length of the whole lens system; and $f_1$ is the focal length of the first lens.

Preferably, the image readout lens in accordance with the present invention further satisfies the following conditional expression (3):

$$-0.66 < f_3/f < -0.40 \tag{3}$$

where f is the composite focal length of the whole lens system; and $f_3$ is the focal length of the third lens.

Preferably, the image readout lens in accordance with the present invention further satisfies the following conditional expression (4):

$$-0.79 < f_{23}/f_4 < -0.51 \tag{4}$$

where $f_{23}$ is the composite focal length of the second and third lenses; and $f_4$ is the focal length of the fourth lens.

Preferably, the image readout lens in accordance with the present invention further satisfies all of the above-mentioned conditional expressions (1) to (4).

The image readout apparatus in accordance with the present invention uses the above-mentioned image readout lens.

While the image readout lens in accordance with the present invention can be used as an image reducing lens when the first to fourth lenses are successively disposed in this order from the object side as mentioned above, it can be used as an image enlarging lens when the whole lens system is reversed as it is such that the first to fourth lenses are disposed in this order from the imaging surface side.

BRIEF DESCRIPTION OF THE DRAWINGS

FIGS. 3A, 3B and 3C are aberration charts (showing spherical aberration, astigmatism, and distortion) of the image readout lens in accordance with Example 1;

FIGS. 4A, 4B and 4C are aberration charts (showing coma) of the image readout lens in accordance with Example 1;

FIGS. 5A, 5B and 5C are aberration charts (showing spherical aberration, astigmatism, and distortion) of the image readout lens in accordance with Example 2;

FIGS. 6A, 6B and 6C are aberration charts (showing coma) of the image readout lens in accordance with Example 2;

FIG. 7 is a schematic view showing the basic configuration of the image readout lens in accordance with Example 3;

FIGS. 9A, 9B and 9C are aberration charts (showing coma) of the image readout lens in accordance with Example 3;

FIGS. 12A, 12B and 12C are aberration charts (showing coma) of the image readout lens in accordance with Example 4;

FIGS. 13A, 13B and 13C are aberration charts (showing spherical aberration, astigmatism, and distortion) of the image readout lens in accordance with Example 5; and FIGS. 14A, 14B and 14C are aberration charts (showing coma) of the image readout lens in accordance with Example 5.

DESCRIPTION OF THE PREFERRED EMBODIMENTS

In the following, embodiments of the present invention will be explained with reference to the accompanying drawings.

Figure 1:
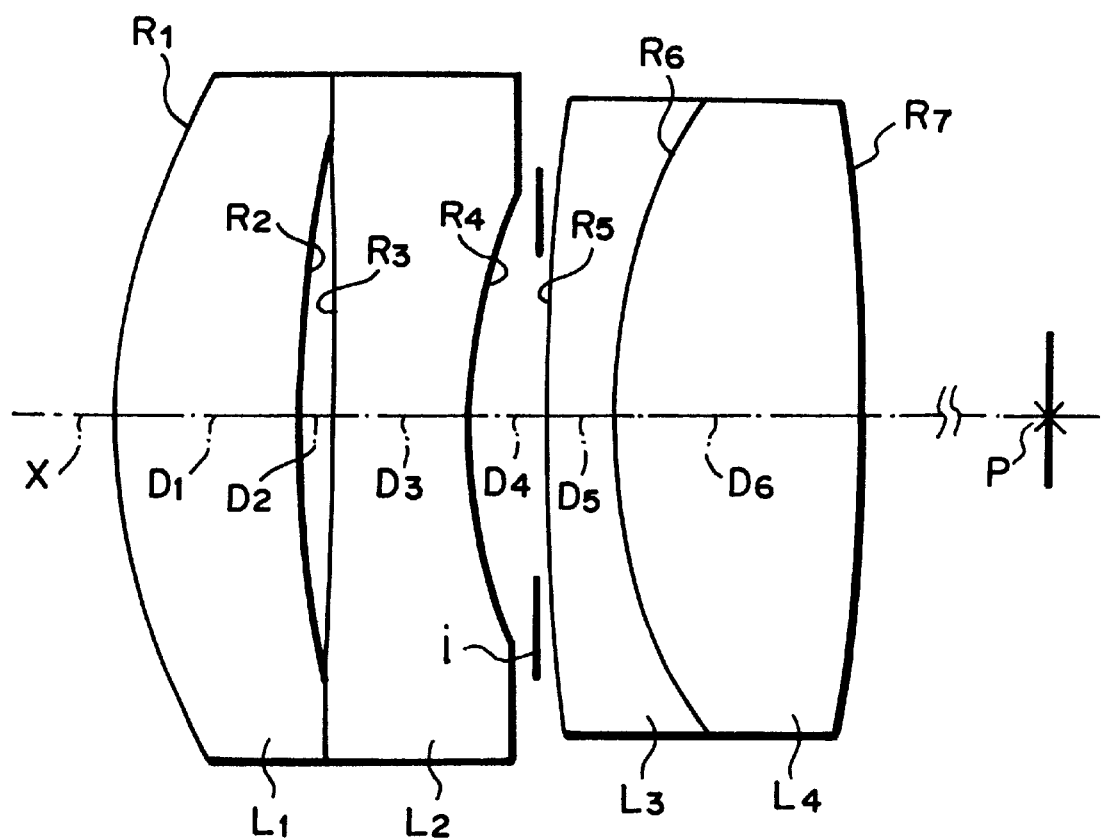
FIG. 1 is a schematic view showing the basic configuration of the image readout lens in accordance with Examples 1 and 2.
Figure 2:
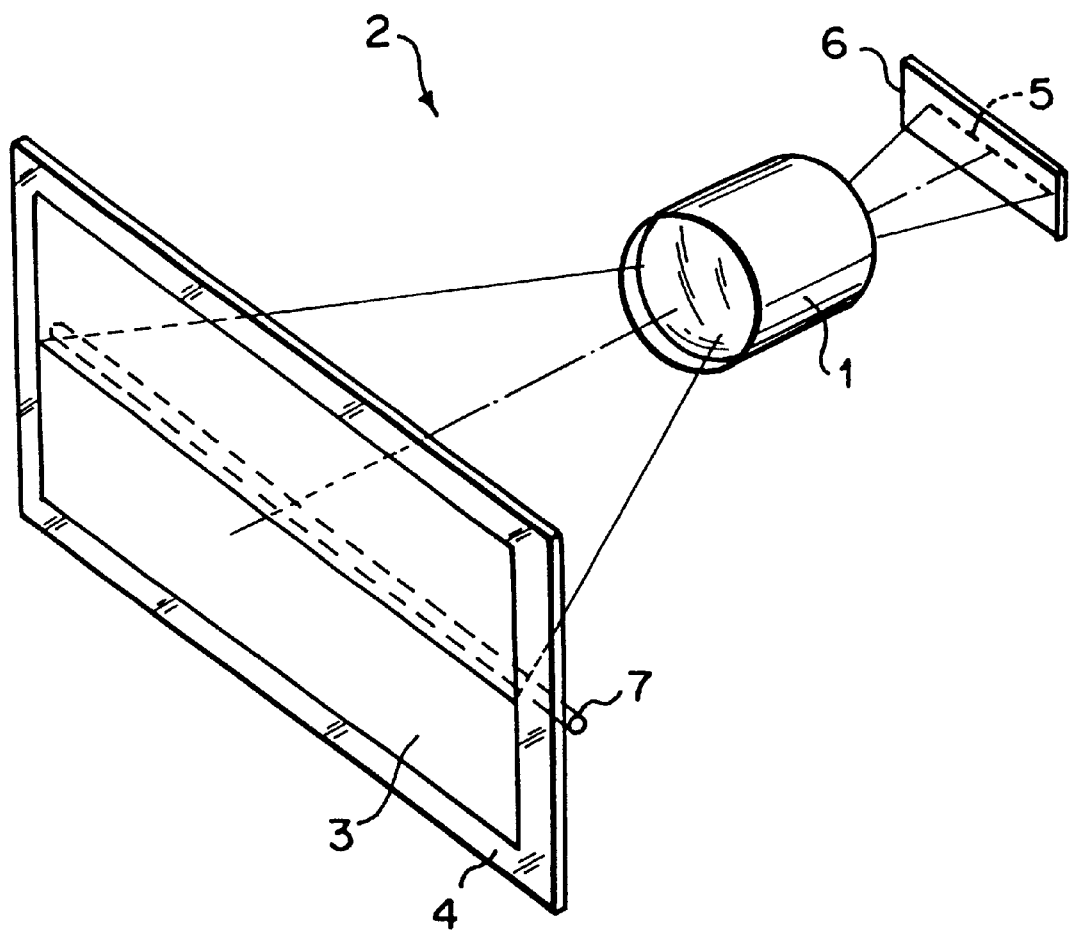
FIG. 2 is a schematic configurational view showing an image readout apparatus using the image readout lens in accordance with the present invention.

FIG. 1 shows, as representative of the embodiments of the present invention, the basic lens configuration of Examples 1 and 2, whereas FIG. 2 shows the schematic configuration of an image readout apparatus using the image readout lens in accordance with the present invention.

As shown in FIG. 2, the image readout lens 1 in accordance with the present invention is an imaging lens used in an optical system of an image readout apparatus 2 such as facsimile machine or image scanner. In this image readout apparatus 2, the image readout lens 1 is disposed between a glass plate 4 for mounting an original 3 and a CCD cover glass 6 of a linear CCD 5, and an illumination device 7 is disposed on the image readout lens 1 side of the glass plate 4.

In this image readout apparatus 2, as the illumination device 7 emits light toward the original 3, a luminous flux reflected by the original 3 forms an image via the image readout lens 1, and thus formed image is read out by the linear CCD 5.

As shown in FIG. 1, the image readout lens in accordance with Examples 1 and 2 is constituted by four lenses $L_1$ to $L_4$, and a stop i disposed between the second lens $L_2$ and the third lens $L_3$, whereby the luminous flux incident thereon from the object side along its optical axis X forms an image at the imaging position P.

This image readout lens comprises, successively from the object side, the first lens $L_1$ made of a positive meniscus lens which is convex toward the object, the second lens $L_2$ and the third lens $L_3$ each made of a negative lens having an image-side surface concave toward the image, and the fourth lens $L_4$ made of a biconvex lens.

Also, a lens glass material of at least one of the second lens $L_2$ and third lens $L_3$ satisfies the following conditional expression (1):

$$\theta_{g,F}+0.0019\upsilon_d<0.650 \quad (1)$$

where $\theta_{g,F}$ is the relative partial dispersion of the lens glass material defined by $\theta_{g,F}=(N_g-N_F)/(N_F-N_C)$; and $\upsilon_d$ is the Abbe number of the lens glass material defined by $\upsilon_d=(N_d-1)/(N_F-N_C)$ where $N_g$ is the refractive index of the glass material at a wavelength of 435.8 nm;

$N_F$ is the refractive index of the glass material at a wavelength of 486.1 nm;

$N_C$ is the refractive index of the glass material at a wavelength of 656.3 nm; and $N_d$ is the refractive index of the glass material at a wavelength of 587.6 nm.

Further, this image readout lens satisfies the following conditional expressions (2) to (4):

$$0.35<f_1/f<0.58 \quad (2)$$

$$-0.66<f_3/f<-0.40 \quad (3)$$

$$-0.79<f_{23}/f_4<-0.51 \quad (4)$$

where f is the composite focal length of the whole lens system;

$f_1$ is the focal length of the first lens $L_1$;

$f_3$ is the focal length of the third lens $L_3$;

$f_4$ is the focal length of the fourth lens $L_4$; and $f_{23}$ is the composite focal length of the second lens $L_2$ and third lens $L_3$.

When the glass material of at least one of the second lens $L_2$ and third lens $L_3$ satisfies the above-mentioned conditional expression (1), chromatic aberration can favorably be corrected, whereby the image readout lens can become a lens suitable for reading out originals with color images. Above the upper limit of conditional expression (1), axial chromatic aberration cannot favorably be corrected, whereby the focal positions for the respective colors may shift from each other along the optical axis direction, thus failing to yield a focal depth necessary for reading out color images.

As a lens glass material having the relative partial dispersion $\theta_{g,F}$ and Abbe number $\upsilon_d$ satisfying conditional expression (1), a glass material having anomalous dispersion, for example, can be used.

A color-image readout lens with higher performances can be obtained when conditional expressions (2) to (4) are further satisfied.

Above the upper limit of conditional expression (2), astigmatism would increase, and distortion may not favorably be corrected. Below the lower limit thereof, image surface curvature would increase, whereby homogenous imaging performances may not be obtained throughout the plane.

Above the upper limit of conditional expression (3), coma may not favorably be corrected. Below the lower limit thereof, spherical aberration and image surface curvature may not appropriately be corrected, whereby homogenous imaging performances may not be obtained throughout the plane, either.

Conditional expression (4) defines the ratio of the composite focal length of the second lens $L_2$ and third lens $L_3$ to the focal length of the fourth lens $L_4$. Above the upper limit thereof, image surface curvature may not favorably be corrected. Below the lower limit thereof, both astigmatism and distortion would increase, whereby imaging picture quality may deteriorate.

In the following, Examples 1 to 5 will be explained with reference to specific values.

The image readout lenses in accordance with Examples 1 to 5 are normalized at a focal length of 100 mm, and can be used with their focal lengths being determined for the respective sizes of originals as each Example is proportionally reduced or enlarged in conformity to the size of the original to be read out.

EXAMPLE 1

As shown in FIG. 1, the image readout lens in accordance with Example 1 comprises, successively from the object side, the first lens $L_1$ made of a positive meniscus lens having a convex surface directed onto the object side, the second lens $L_2$ made of a biconcave lens having a surface with a larger curvature directed onto the image side, the third lens $L_3$ made of a negative meniscus lens having a convex surface directed onto the object side, and the fourth lens $L_4$ made of a biconvex lens having a surface with a larger curvature directed onto the object side, in which the third lens $L_3$ and the fourth lens $L_4$ form a cemented lens.

The following Table 1 shows the radius of curvature R (mm) of each lens surface, center thickness of each lens and air space between neighboring lenses D (mm), refractive index $N_d$ and Abbe number $\upsilon_d$ of each lens at d-line (wavelength: 587.6 nm), and glass material product name of each lens in Example 1.

In Table 1, as well as Tables 4, 6, 8, and 10 which will be mentioned later, numerals referring to the letters R, D, $N_d$, and $\upsilon_d$ successively increase from the object side.

In Table 1, as well as Tables 4, 6, 8, and 10 which will be mentioned later, the lens in which "*" is attached to the left side of its glass material product name is formed from a glass material satisfying conditional expression (1).

Table 2 (follows) shows the refractive indexes $N_g$, $N_F$, and $N_C$ at the respective wavelengths of 435.8 nm, 486.1 nm, and 656.3 nm and relative partial dispersion $\theta_{g,F}$ of the glass material for the third lens $L_3$ satisfying conditional expression (1) in Example 1.

Table 3 (follows) shows the values of composite focal length f, F number, imaging magnification β, and half angle of view ω of the whole lens system in the image readout lens in Example 1, and the values corresponding to conditional expressions (1) to (4) in Example 1.

As can be seen from Table 3, conditional expressions (1) to (4) are satisfied in Example 1.

FIGS. 3A, 3B and 3C are aberration charts (showing spherical aberration, astigmatism, and distortion) of the image readout lens in accordance with Example 1, whereas FIG. 4 is an aberration chart showing coma thereof. In these aberration charts, ω indicates the half angle of view. The spherical aberration chart indicates the respective aberrations with respect to e-line, g-line, and C-line. The astigmatism chart shows the respective aberrations with respect to the sagittal image surface (S) and tangential image surface (T). (The same holds true for the following aberration charts, i.e., FIGS. 5, 6, 8, 9, and 11 to 14.)

Each of the aberration charts of the image readout lens in accordance with Example 1 shown in FIGS. 3 and 4 refers to the state where glass plates (refractive index: 1.52) having thicknesses of 6.48 mm and 1.51 mm are inserted in the optical path on the object side and image side, respectively.

As can be seen from FIGS. 3 and 4, all the kinds of aberration mentioned above can be made favorable in Example 1. Also, since the respective aberration curves at the wavelengths of e-line, g-line, and C-line do not fluctuate much among them, it can be seen that chromatic aberration can favorably be corrected.

When Example 1 is used as being proportionally reduced for reading out the shorter side of A4-size sheet, its focal length becomes 46.3 mm.

EXAMPLE 2

The configuration of the image readout lens in accordance with Example 2 is substantially the same as that of Example 1.

The following Table 4 shows the radius of curvature R (mm) of each lens surface, center thickness of each lens and air space between neighboring lenses D (mm), refractive index $N_d$ and Abbe number $\upsilon_d$ of each lens at d-line, and glass material product name of each lens in Example 2.

As shown in Table 4, the third lens $L_3$ is formed from a glass material satisfying conditional expression (1). The glass material for the third lens $L_3$ is the same as that of Example 1.

Table 5 (follows) shows the values of composite focal length f, F number, imaging magnification β, and half angle of view ω of the whole lens system in the image readout lens in Example 2, and the values corresponding to conditional expressions (1) to (4) in Example 2.

As can be seen from Table 5, conditional expressions (1) to (4) are satisfied in Example 2.

FIGS. 5A, 5B and 5C are aberration charts (showing spherical aberration, astigmatism, and distortion) of the image readout lens in accordance with Example 2, whereas FIG. 6 is an aberration chart showing coma thereof. Each of the aberration charts of the image readout lens in accordance with Example 2 shown in FIGS. 5 and 6 refers to the state where glass plates (refractive index: 1.52) having thicknesses of 6.49 mm and 1.52 mm are inserted in the optical path on the object side and image side, respectively.

As can be seen from FIGS. 5 and 6, all the kinds of aberration mentioned above such as chromatic aberration can be made favorable in Example 2 as with Example 1.

When Example 2 is used as being proportionally reduced for reading out the shorter side of A4-size sheet, its focal length becomes 46.2 mm.

EXAMPLE 3

As shown in FIG. 7, the image readout lens in accordance with Example 3 comprises, successively from the object side, a first lens $L_1$ made of a positive meniscus lens having a convex surface directed onto the object side, a second lens $L_2$ made of a biconcave lens having a surface with a larger curvature directed onto the image side, a third lens $L_3$ made of a negative meniscus lens having a convex surface directed onto the object side, and a fourth lens $L_4$ made of a biconvex lens having a surface with a larger curvature directed onto the object side.

The following Table 6 shows the radius of curvature R (mm) of each lens surface, center thickness of each lens and air space between neighboring lenses D (mm), refractive index $N_d$ and Abbe number $\upsilon_d$ of each lens at d-line, and glass material product name of each lens in Example 3.

As shown in Table 6, the second lens $L_2$ is formed from a glass material satisfying conditional expression (1). The glass material for the second lens $L_2$ is the same as the glass material for the third lens $L_3$ in Example 1.

Table 7 (follows) shows the values of composite focal length f, F number, imaging magnification β, and half angle of view ω of the whole lens system in the image readout lens in Example 3, and the values corresponding to conditional expressions (1) to (4) in Example 3.

As can be seen from the Table 7, conditional expressions (1) to (4) are satisfied in Example 3.

Figure 8C:
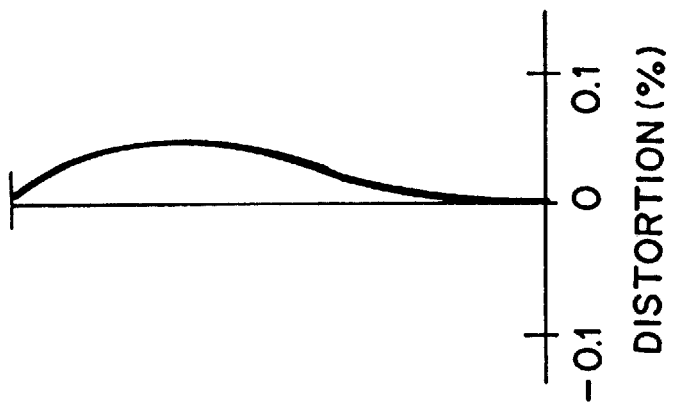
FIGS. 8A, 8B and 8C are aberration charts (showing spherical aberration, astigmatism, and distortion) of the image readout lens in accordance with Example 3.
Figure 8B:
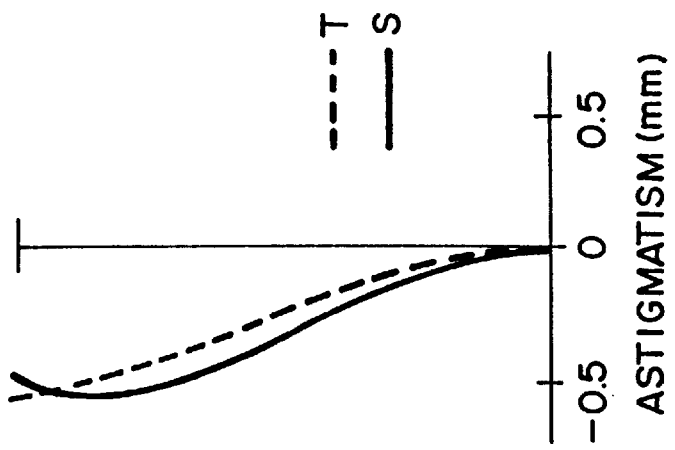
Figure 8A:

FIGS. 8A, 8B and 8C are aberration charts (showing spherical aberration, astigmatism, and distortion) of the image readout lens in accordance with Example 3, whereas FIG. 9 is an aberration chart showing coma thereof. Each of the aberration charts of the image readout lens in accordance with Example 3 shown in FIGS. 8 and 9 refers to the state where glass plates (refractive index: 1.52) having thicknesses of 6.47 mm and 1.51 mm are inserted in the optical path on the object side and image side, respectively.

As can be seen from FIGS. 8 and 9, all the kinds of aberration mentioned above such as chromatic aberration can be made favorable in Example 3 as with Example 1.

When Example 3 is used as being proportionally reduced for reading out the shorter side of A4-size sheet, its focal length becomes 46.4 mm.

EXAMPLE 4

Figure 10:
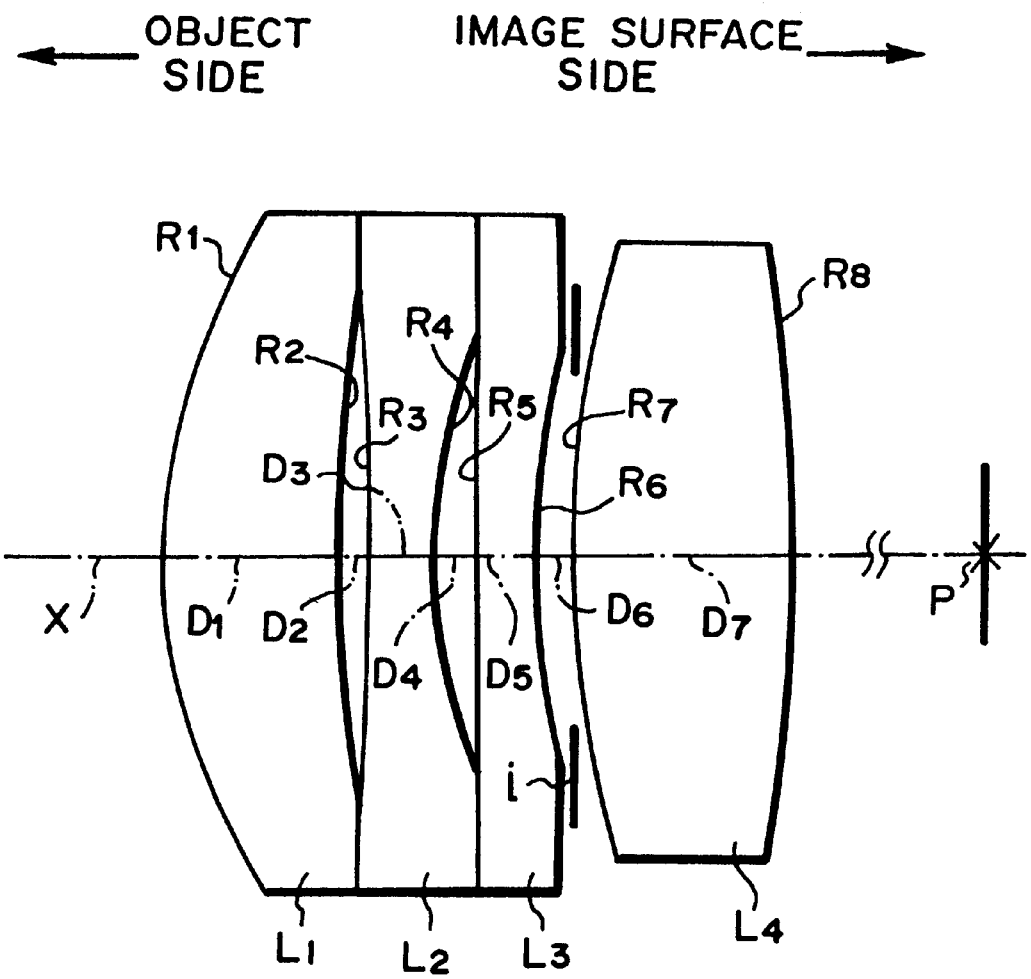
FIG. 10 is a schematic view showing the basic configuration of the image readout lens in accordance with Examples 4 and 5.

As shown in FIG. 10, the image readout lens in accordance with Example 4 is configured substantially the same as that of Example 3 except that the stop i is disposed between the third lens $L_3$ and the fourth lens $L_4$.

The following Table 8 shows the radius of curvature R (mm) of each lens surface, center thickness of each lens and air space between neighboring lenses D (mm), refractive index $N_d$ and Abbe number $\upsilon_d$ of each lens at d-line, and glass material product name of each lens in Example 4.

As shown in Table 8, the second lens $L_2$ is formed from a glass material satisfying conditional expression (1). The glass material for the second lens $L_2$ is the same as the glass material for the third lens $L_3$ in Example 1.

Table 9 (follows) shows the values of composite focal length f, F number, imaging magnification β, and half angle of view ω of the whole lens system in the image readout lens in Example 4, and the values corresponding to conditional expressions (1) to (4) in Example 4.

As can be seen from the Table 9, conditional expressions (1) to (4) are satisfied in Example 4.

Figure 11C:
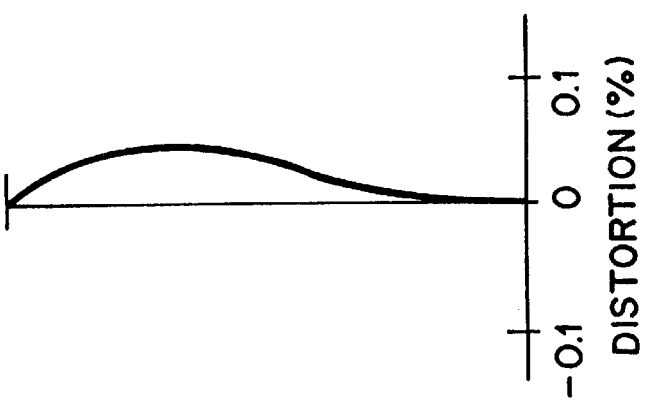
FIGS. 11A, 11B and 11C are aberration charts (showing spherical aberration, astigmatism, and distortion) of the image readout lens in accordance with Example 4.
Figure 11B:
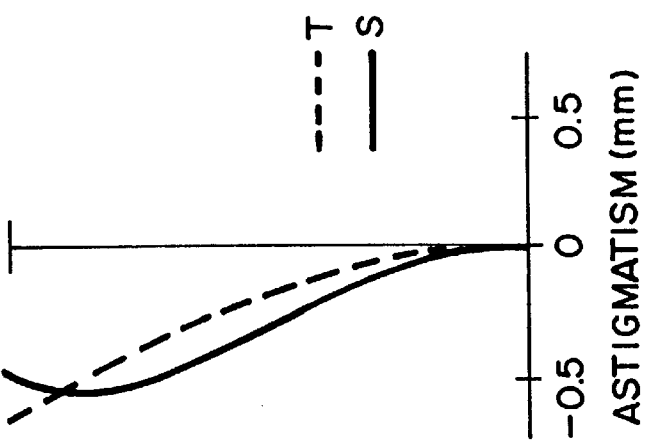
Figure 11A:
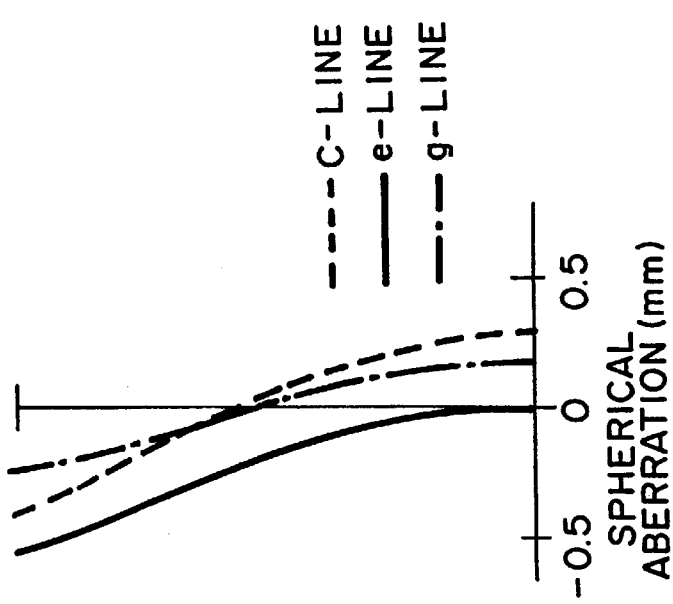

FIGS. 11A, 11B and 11C are aberration charts (showing spherical aberration, astigmatism, and distortion) of the image readout lens in accordance with Example 4, whereas FIG. 12 is an aberration chart showing coma thereof. Each of the aberration charts of the image readout lens in accordance with Example 4 shown in FIGS. 11 and 12 refers to the state where glass plates (refractive index: 1.52) having thicknesses of 6.47 mm and 1.51 mm are inserted in the optical path on the object side and image side, respectively.

As can be seen from FIGS. 11 and 12, all the kinds of aberration mentioned above such as chromatic aberration can be made favorable in Example 4 as with Example 1.

When Example 4 is used as being proportionally reduced for reading out the shorter side of A4-size sheet, its focal length becomes 46.4 mm.

EXAMPLE 5

The image readout lens in accordance with Example 5 is configured substantially similar to that of Example 4 as shown in FIG. 10.

The following Table 10 shows the radius of curvature R (mm) of each lens surface, center thickness of each lens and air space between neighboring lenses D (mm), refractive index $N_d$ and Abbe number $\upsilon_d$ of each lens at d-line, and glass material product name of each lens in Example 5.

As shown in Table 10, the second lens $L_2$ is formed from a glass material satisfying conditional expression (1).

Table 11 (follows) shows the refractive indexes $N_g$, $N_F$, and $N_C$ at the respective wavelengths of 435.8 nm, 486.1 nm, and 656.3 nm and relative partial dispersion $\theta_{g,F}$ of the glass material for the second lens $L_2$ satisfying conditional expression (1) in Example 5.

Table 12 (follows) shows the values of composite focal length f, F number, imaging magnification :βand half angle of view ω of the whole lens system in the image readout lens in Example 5, and the values corresponding to conditional expressions (1) to (4) in Example 5.

As can be seen from Table 12, conditional expressions (1) to (4) are satisfied in Example 5.

FIGS. 13A, 13B and 13C are aberration charts (showing spherical aberration, astigmatism, and distortion) of the image readout lens in accordance with Example 5, whereas FIG. 14 is an aberration chart showing coma thereof. Each of the aberration charts of the image readout lens in accordance with Example 5 shown in FIGS. 13 and 14 refers to the state where glass plates (refractive index: 1.52) having thicknesses of 6.47 mm and 1.51 mm are inserted in the optical path on the object side and image side, respectively.

As can be seen from FIGS. 13 and 14, all the kinds of aberration mentioned above such as chromatic aberration can be made favorable in Example 5 as with Example 1.

When Example 5 is used as being proportionally reduced for reading out the shorter side of A4-size sheet, its focal length becomes 46.4 mm.

Without being restricted to the foregoing Examples, the imaging lens in accordance with the present invention can be modified in various manners. For example, the radius of curvature R of each lens and lens spacing (or lens thickness) D can be changed as appropriate.

As explained in the foregoing, the image readout lens in accordance with the present invention can achieve sufficiently favorable optical performances also as a color-image readout lens by defining the glass material of at least one of the second lens $L_2$ and third lens $L_3$, each of which is made of a negative lens having an image-side surface concave toward the image, in terms of its relative partial dispersion and Abbe number.

The image readout lens in accordance with the present invention has favorable imaging performances within the range from about 1/5×to 1/20×, in particular, for reduction, and is suitable as an image readout lens for originals on the order of the A3-size short side, i.e., 297 mm, Japanese B4-size short side, i.e., 257 mm, A4- or letter-size short side, i.e., 216 mm, and the like.

TABLE 1

Example 1

| Surface | R | D | $N_d$ | $v_d$ | Glass material product name |
|---|---|---|---|---|---|
| 1 | 26.262 | 6.808 | 1.80235 | 46.7 | LASF-N6 (Sumita) |
| 2 | 61.691 | 1.145 | | | |
| 3 | −537.609 | 5.252 | 1.68893 | 31.2 | SF-8 (Sumita) |
| 4 | 23.250 | 2.810 | | | |

TABLE 1-continued

Example 1

| Surface | R | D | $N_d$ | $v_d$ | | Glass material product name |
|---|---|---|---|---|---|---|
| 5 | 121.531 | 2.593 | 1.61340 | 43.8 | * | KZFS-4 (Sumita) |
| 6 | 22.079 | 9.661 | 1.74400 | 44.9 | | LAF-2 (Sumita) |
| 7 | −87.093 | | | | | |

TABLE 2

Refractive Indexes at Respective Wavelengths and Relative Partial Diffraction of Corresponding Lens Glass Material (KZFS-4)

| | |
|---|---|
| $N_g$ | 1..63107 |
| $N_F$ | 1.62319 |
| $N_C$ | 1.60920 |
| $\theta_{g\text{-}F}$ | 0.563 |

TABLE 3

Numeric data

| Item | Symbol | |
|---|---|---|
| Focal length | f | 100 |
| F number | FNO | 7.1 |
| Imaging magnification | β | −0.18898 |
| Half angle of view | ω | 21.4° |
| Conditional expression (1) | $\theta_{g\text{-}F}+0.0019\ v_d$ | 0.646 |
| Conditional expression (2) | $f_1/f$ | 0.525 |
| Conditional expression (3) | $f_3/f$ | −0.444 |
| Conditional expression (4) | $f_{23}/f_4$ | −0.713 |

TABLE 4

Example 2

| Surface | R | D | $N_d$ | $v_d$ | | Glass material product name |
|---|---|---|---|---|---|---|
| 1 | 26.347 | 6.915 | 1.80235 | 46.7 | | LASF-N6 (Sumita) |
| 2 | 65.917 | 1.512 | | | | |
| 3 | −478.025 | 4.330 | 1.68893 | 31.2 | | SF-8 (Sumita) |
| 4 | 23.462 | 3.247 | | | | |
| 5 | 145.048 | 2.691 | 1.61340 | 43.8 | * | KZFS-4 (Sumita) |
| 6 | 23.648 | 9.115 | 1.74400 | 44.9 | | LAF-2 (Sumita) |
| 7 | −84.422 | | | | | |

TABLE 5

Numeric data

| Item | Symbol | |
|---|---|---|
| Focal length | f | 100 |
| F number | FNO | 7.1 |
| Imaging magnification | β | −0.18898 |
| Half angle of view | ω | 21.4° |
| Conditional expression (1) | $\theta_{g\text{-}F}+0.0019\ v_d$ | 0.646 |
| Conditional expression (2) | $f_1/f$ | 0.508 |
| Conditional expression (3) | $f_3/f$ | −0.465 |
| Conditional expression (4) | $f_{23}/f_4$ | −0.693 |

TABLE 6

Example 3

| Surface | R | D | $N_d$ | $v_d$ | | Glass material product name |
|---|---|---|---|---|---|---|
| 1 | 22.126 | 6.469 | 1.71300 | 53.9 | | LAK-8 (Sumita) |
| 2 | 92.865 | 0.647 | | | | |
| 3 | −229.755 | 1.651 | 1.61340 | 43.8 | * | KZFS-4 (Sumita) |
| 4 | 20.370 | 2.336 | | | | |
| 5 | 618.657 | 2.156 | 1.78472 | 25.7 | | SF-11 (Sumita) |
| 6 | 42.290 | 0.586 | | | | |
| 7 | 41.070 | 8.262 | 1.80500 | 39.6 | | LASF-N2 (Sumita) |
| 8 | −69.345 | | | | | |

TABLE 7

Numeric data

| Item | Symbol | |
|---|---|---|
| Focal length | f | 100 |
| F number | FNO | 7.1 |
| Imaging magnification | β | −0.18898 |
| Half angle of view | ω | 21.4° |
| Conditional expression (1) | $\theta_{g\text{-}F}+0.0019\ v_d$ | 0.646 |
| Conditional expression (2) | $f_1/f$ | 0.392 |
| Conditional expression (3) | $f_3/f$ | −0.579 |
| Conditional expression (4) | $f_{23}/f_4$ | −0.577 |

TABLE 8

Example 4

| Surface | R | D | $N_d$ | $v_d$ | | Glass material product name |
|---|---|---|---|---|---|---|
| 1 | 23.077 | 6.472 | 1.71300 | 53.9 | | LAK-8 (Sumita) |
| 2 | 92.028 | 0.647 | | | | |
| 3 | −202.893 | 2.726 | 1.61340 | 43.8 | * | KZFS-4 (Sumita) |
| 4 | 21.782 | 1.293 | | | | |
| 5 | 398.140 | 2.216 | 1.78472 | 25.7 | | SF-11 (Sumita) |
| 6 | 42.097 | 1.077 | | | | |
| 7 | 43.687 | 8.339 | 1.80600 | 40.7 | | LASF-N1 (Sumita) |
| 8 | −67.506 | | | | | |

TABLE 9

Numeric data

| Item | Symbol | |
|---|---|---|
| Focal length | f | 100 |
| F number | FNO | 7.1 |
| Imaging magnification | β | −0.18898 |
| Half angle of view | ω | 21.4° |
| Conditional expression (1) | $\theta_{g\text{-}F}+0.0019\ v_d$ | 0.646 |
| Conditional expression (2) | $f_1/f$ | 0.416 |
| Conditional expression (3) | $f_3/f$ | −0.602 |
| Conditional expression (4) | $f_{23}/f_4$ | −0.594 |

TABLE 10

Example 5

| Surface | R | D | $N_d$ | $v_d$ | | Glass material product name |
|---|---|---|---|---|---|---|
| 1 | 22.597 | 6.103 | 1.71300 | 53.9 | | LAK-8 (Sumita) |
| 2 | 83.803 | 0.798 | | | | |
| 3 | −211.071 | 2.415 | 1.61340 | 44.3 | * | BPM51 (Ohara) |

TABLE 10-continued

Example 5

| Surface | R | D | $N_d$ | $v_d$ | Glass material product name |
|---|---|---|---|---|---|
| 4 | 21.890 | 1.337 | | | |
| 5 | 300.113 | 2.458 | 1.78472 | 25.7 | SF-11 (Sumita) |
| 6 | 39.862 | 1.078 | | | |
| 7 | 43.280 | 7.677 | 1.80600 | 40.7 | LASF-N1 (Sumita) |
| 8 | −66.977 | | | | |

TABLE 11

Refractive Indexes at Respective Wavelengths and Relative Partial Diffraction of Corresponding Lens Glass Material (BPM51)

| | |
|---|---|
| $N_g$ | 1.63088 |
| $N_F$ | 1.62310 |
| $N_C$ | 1.60924 |
| $\theta_{g \cdot F}$ | 0.561 |

TABLE 12

Numeric data

| Item | Symbol | |
|---|---|---|
| Focal length | f | 100 |
| F number | FNO | 7.1 |
| Imaging magnification | β | −0.18898 |
| Half angle of view | ω | 21.4° |
| Conditional expression (1) | $\theta_{g \cdot F} + 0.0019 v_d$ | 0.645 |
| Conditional expression (2) | $f_1/f$ | 0.417 |
| Conditional expression (3) | $f_3/f$ | −0.588 |
| Conditional expression (4) | $f_{23}/f_4$ | −0.598 |

What is claimed is:

1. An image readout lens comprising, successively from an object side, a first lens which is a lens closest to the object side made of a positive meniscus lens which is convex toward the object side, second and third lenses each having a surface on an image side concave toward an image side and a negative refracting power, and a fourth lens made of a biconvex lens, and wherein at least one of said second and third lenses comprises a glass material and wherein said lens glass material of at least one of said second and third lenses satisfies the following conditional expression (1):

$$\Theta_{g \cdot F} + 0.0019 v_d < 0.650 \quad (1)$$

where $\Theta_{g \cdot F}$ is the relative partial dispersion of the lens glass material defined by $\Theta_{g \cdot F} = (N_g - N_F / N_F - N_c)$; and $v_d$ is the Abbe number of the lens glass material defined by $v_d = (N_d - 1)/N_F - N_c)$ where $N_g$ is the refractive index of the glass material at a wavelength of 435.8 nm;

$N_F$ is the refractive index of the glass material at a wavelength of 486.1 nm;

$N_c$ is the refractive index of the glass material at a wavelength of 656.3 nm; and $N_d$ is the refractive index of the glass material at a wavelength of 587.6 nm.

2. An image readout apparatus using the image readout lens according to claim 1.

3. An image readout lens according to claim 1, further satisfying the following conditional expression (2):

$$0.35 < f_1/f < 0.58 \quad (2)$$

where f is the composite focal length of the whole lens system; and $f_1$ is the focal length of the first lens.

4. An image readout lens according to claim 1, further satisfying the following conditional expression (3):

$$-0.66 < f_3/f < -0.40 \quad (3)$$

where f is the composite focal length of the whole lens system; and $f_3$ is the focal length of the third lens.

5. An image readout lens according to claim 1, further satisfying the following conditional expression (4):

$$-0.79 < f_{23}/f_4 < -0.51 \quad (4)$$

where $f_{23}$ is the composite focal length of the second and third lenses; and $f_4$ is the focal length of the fourth lens.

6. An image readout lens according to claim 1, further satisfying the following conditional expression (2) to (4):

$$0.35 < f_1/f < 0.58 \quad (2)$$

$$-0.66 < f_3/f < -0.40 \quad (3)$$

$$-0.79 < f_{23}/f_4 < -0.51 \quad (4)$$

where f is the composite focal length of the whole lens system;

$f_1$ is the focal length of the first lens;

$f_3$ is the focal length of the third lens;

$f_4$ is the focal length of the fourth lens; and $f_{23}$ is the composite focal length of the second and third lenses.

* * * * *

UNITED STATES PATENT AND TRADEMARK OFFICE
CERTIFICATE OF CORRECTION

PATENT NO. : 6,295,169 B1
DATED : September 25, 2001
INVENTOR(S) : Hiromitsu Yamakawa It is certified that error appears in the above-identified patent and that said Letters Patent is hereby corrected as shown below:

Column 11,
Line 53, delete "$\Theta_g \cdot {}_F = (N_g\text{-}N_F / N_F\text{-}N_c)$" and substitute therefore
-- $\Theta_g \cdot {}_F = (N_g\text{-}N_F) / (N_F\text{-}N_c)$ --

Line 55, delete "$v_d = (N_d\text{-}1) / N_F\text{-}N_c)$" and substitute therefore
-- $v_d = (N_d\text{-}1) / (N_F\text{-}N_c)$ --

Signed and Sealed this

Twenty-sixth Day of March, 2002

Attest:

JAMES E. ROGAN
*Attesting Officer*   *Director of the United States Patent and Trademark Office*